Patented Feb. 8, 1944

2,340,938

UNITED STATES PATENT OFFICE 2,340,938

STABILIZED HIGH MOLECULAR WEIGHT HYDROCARBON POLYMER

William J. Daly, Brooklyn, N. Y., assignor to Standard Oil Development Company, a corporation of Delaware No Drawing. Application November 30, 1940, Serial No. 368,107

9 Claims. (Cl. 260—94)

The present invention relates to the preservation of valuable properties of polymeric hydrocarbon compounds, more particularly to stabilization of high molecular weight, highly saturated, linear, hydrocarbon polymers, which are normally resistant to oxidation, against molecular weight breakdown by heat or mechanical action. The invention will be fully understood from the following description.

Valuable polymers of high molecular weight, prepared from low molecular weight mono-olefins are of the types known as linear or chain polymers for the reason that the polymerization of the monomeric olefins proceeds linearly to produce carbon chains of enormous length. The branched linear polymers formed from mono-olefins which are branched, i. e., iso-mono-olefins, are of exceedingly great value on account of their high molecular weights, oil solubility, and chemical resistance. This is particularly true of polymers formed from isobutene, e. g., polybutenes, because these polymers may be in the form of plastic solids as well as highly viscous liquids.

The described linear polymers, and those of isobutene in particular, are sensitive to breakdown on moderate heating. This breakdown is not a heterogeneous cracking, but is a true depolymerization or a cleavage in the chain. Such instability has advantages in certain respects, in that as depolymerization occurs, there is no formation of a coked residue; but on the other hand it is highly advantageous to depress depolymerization in many uses of these polymers.

While the linear polymers in their unprotected state are stable generally for several hours at 100° C., it is found that on heating them for an extended period at a temperature above 100° C. depolymerization is clearly evidenced by loss in their molecular weight and loss of certain desirable characteristics, such as stringiness, tensile strength, and elasticity. At higher temperatures, depolymerization is more rapid and accelerates with increase in temperature. Therefore, it is highly desirable to raise the temperature range in which depolymerization of the polymer tends to occur and to strengthen the polymer against breakdown under ordinary service and working conditions.

It was found that the addition of relatively small amounts of certain substances, e. g., phenols, thiophenols and phenolic sulfides, greatly delays the rate at which described linear depolymerization proceeds at elevated temperatures, and apparently these particular substances considerably raise the threshold value at which the depolymerization becomes appreciable. In addition to the breakdown of the polymers by heating, some depolymerization can be ascribed to mechanical working or attrition of the polymer and some to the action of actinic or ultraviolet rays. An object of this invention is to stabilize the hydrocarbon polymers against depolymerization or the breakdown effect of these several causes; and it has now been found that there are metallic derivatives of the phenolic compounds which are superior to the phenolic compounds themselves in stabilizing power and which are more efficient for use when the polymer is to be compounded with other materials.

The stabilizing substances employed in accordance with the present invention are metallic derivatives of phenols, particularly the phenol sulfides, and of the corresponding compounds in which sulfur, selenium or tellurium replaces oxygen in the hydroxyl groups. More exactly, the stabilizing substances may be defined as metal derivatives of compounds of the formula:

$$Ar—XH$$

wherein Ar is an aromatic cyclic compound nucleus and X represents an atom of oxygen or an atom of a negative element in the sulfur family such as sulfur, selenium or tellurium. Of these negative element constituents, usually oxygen is preferred on account of the greater availability of such compounds. The compounds may also contain alkyl constituents in the aromatic nucleus.

The metallic derivatives of the above-defined compounds, regardless of whether they are oxy- or thio-phenols, are readily prepared by replacing the hydrogen in the hydroxyl or thiohydroxyl by a metal. This replacement of the hydrogen by a metal is accomplished very readily by reacting the compound with a base of the desired metal or by metathesis of a phenolate with a salt of the desired metal.

To form the preferred metallic derivatives for use in stabilizing the polymers, it has been found desirable to form the metallic derivatives of phenolic or thiophenolic compounds which contain, in addition to the hydroxyl or thiohydroxyl group, atoms of the sulfur family elements, preferably sulfur constituents which link together phenolic groups by a thioether linkage. The thioether linkage may contain one or more of the sulfur family atoms, and accordingly, the phenolic compounds thus joined together form compounds which may be termed monosulfides, disulfides, polysulfides, or analogous selenides, tellurides, etc.

The aromatic nuclei in the phenolic thioethers and their analogues may also contain other constituents, such as hydroxyl, amino, halogen, carboxylic, alkoxy groups, or the like.

In order to more clearly indicate the types of substances falling under the class of metallic derivatives of phenolic, thiophenolic and similar compounds that have been found efficiently useful for stabilizing the linear polymers, a number of formulae will be described but it is to be understood that these are not to be taken as limitative, but only as illustrations of the types of compounds with which the present invention is concerned as stabilizing agents. Other metallic derivatives coming within the broad definitions given above may be used with similar satisfactory results. Many of these derivatives are characterized by the following groupings:

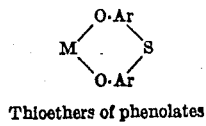

Thioethers of phenolates

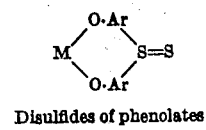

Disulfides of phenolates wherein M represents a divalent or polyvalent metal and Ar represents an aromatic nucleus.

The metal phenolates are benefited in effectiveness and compatibility with the polymers by having hydrocarbon substituents in the aromatic nuclei. Preferably the phenolates are formed from alkyl phenols and among these, the most readily available are tertiary amyl and di-isobutyl phenols, or similar phenols containing an isoalkyl substituent.

The phenolate sulfides containing as the metal constituent (M) nickel, lead, zinc, and barium have been found especially suitable, although it is within the contemplation of this invention to use other common metals as the metal constituents. It is thus to be noted that the more suitable are polyvalent base metals. The metal derivatives of the phenolic and related compounds and their sulfides may be prepared in a number of ways, some of which are outlined as follows:

EXAMPLE 1

By treating an alkyl phenol dissolved in anhydrous ethyl alcohol with metallic sodium, the sodium phenolate is formed. The sodium phenolate is reacted with a salt of the desired metal, e. g. nickel chloride or calcium chloride, in alcohol solution to form the polyvalent metal derivative of the phenol by double decomposition. The sodium chloride formed in the reaction separates as a solid from the reaction mixture on account of its insolubility in the alcohol. The polyvalent metal phenolate is recovered from the alcohol solution by evaporation of the alcohol.

EXAMPLE 2

The reaction between a phenol and an oxide or hydroxide of a polyvalent base metal, e. g., calcium hydroxide or barium hydroxide, is effected in an inert solvent, e. g. benzol, by heating under reflux and removing water formed during the reaction. The phenolate product is subsequently recovered by separating unreacted oxide or hydroxide by filtration and evaporating the solvent from the filtrate.

These same general procedures apply to substituted phenolic and thiophenolic compounds containing additional sulfur family constituents as in the phenolic thioethers or sulfides. The technique and proportions are indicated more comprehensively with reference to the preparation of metal salts of alkyl phenol sulfides as shown in the following examples:

EXAMPLE 3

One mol of tertiary amyl phenol thioether (prepared by the method applied in the French Patent 824,600) is dissolved in about 1½ times its volume of absolute alcohol. This solution is added to a solution of sodium ethoxide or sodium ethylate, prepared by dissolving two mols of metallic sodium in an excess of absolute ether alcohol. The sodium salt of the phenol, more specifically the thioether of teritary amyl sodium phenolate is thereby formed and remains in solution in the excess ethyl alcohol. This sodium phenolate derivative may then be reacted with compounds of a polyvalent base metal which it is desired to have replace the sodium.

EXAMPLE 4

A slight excess over the calculated amount of the anhydrous halide of the desired metal such as zinc chloride is dissolved in absolute ethyl alcohol, and the resulting solution is added with stirring to the alcoholic solution of the thioether of the tertiary amyl sodium phenolate described in the preceding example. By the double decomposition reaction, the thioether of tertiary amyl zinc phenolate is formed along with sodium chloride which is insoluble in the absolute alcohol and precipitates therefrom. The precipitated sodium chloride is filtered from the solution, and the alcohol is then removed from the filtrate by evaporation, vacuum being applied during the last stage of the evaporation to protect against decomposition. Any sodium chloride remaining in the solution may be removed by redissolving the dry zinc phenolate in petroleum naphtha free from water and filtering the solution, because the sodium chloride remains undissolved in the naphtha solution.

The foregoing procedure may be used in preparing corresponding thioether phenol salts of nickel, lead, magnesium, calcium, barium, etc. The chlorides of the metals are usually satisfactory. In the case of barium, it is preferred to use the bromide in order to secure better solubility of the barium halide in the absolute alcohol.

In the event the thioether phenolate is precipitated along with the salt of the replaced metal, it may be recovered by extracting the dried precipitate with naphtha then filtering and evaporating the naphtha from the filter. In place of the naphtha an alcohol may be used as a solvent. Isopropyl alcohol may be used in place of ethyl alcohol and together with sodium hydroxide in forming a sodium phenolate which in turn may be reacted with a polyvalent metal compound. Thioether phenolates of metals having sufficiently basic oxides may be prepared by the direct reaction of the phenol thioether with the metal oxide by heating the mixture under reflux and removing the water that is formed. The highly reactive metals, such as metallic magnesium, may be reacted with absolute ethyl alcohol to form the alcoholate which is in turn reacted directly with the phenol thioether.

Thus corresponding metal salts of alkyl phenol disulfides and polysulfides are similarly prepared.

The linear polymers susceptible to depolymerization by heating, mechanical shearing, and compression forces, and ultraviolet rays may be prepared by several known methods, for example, polymerization of mono-olefins is effected by inorganic active halide polymerization catalysts at low temperatures. The gaseous normal mono-olefins, such as ethylene, may be polymerized under high pressure, at moderately elevated temperatures and with the use of small amounts of oxygen as a catalyst.

The particularly useful plastic and solid polybutenes composed essentially of polymerized isobutene are formed at low temperatures, particularly below —40° C., and below —100° C., in the presence of an active halide catalyst which is preferably boron fluoride. In general, the lower the temperature of the polymerization, the higher the molecular weight of the polymer produced. Various polymerization catalysts, such as clays, and various metal halides, such as aluminum chloride, may be used under suitable conditions known to the art. Also, the purity of the reactants, control of the reaction conditions, as by the use of suitable diluents and refrigerants, and the use of promoters are factors for increasing the molecular weight of the product.

It is important in substantially all instances to add the stabilizing agents which have been described to the polymer after the polymer has been produced and not to reactants or reaction mixtures prior to completion of the polymerization, because these stabilizing agents, in general, tend to act as poisons which suppress formation of the desired high molecular weight polymers. The amount of the stabilizing agent to be added to the polymers for effecting their preservation is very small in general, but varies with the particular polymer, the particular stabilizing agent, and the degree of stability desired under certain conditions. Usually more of the stabilizing agent is added to the higher molecular weight polymers; in general, however, the amount of the stabilizing agent used is less than 5% and may be even as low as 0.01% by weight of the polymer to which it is applied.

In order to avoid misunderstanding, it should be noted that the breakdown of the linear highly saturated polymer is not in the usual sense of the term the result of oxidation, and the stabilizing materials do not act simply as oxidation inhibitors, although some of them may act in such a manner in petroleum oils or in other unsaturated hydrocarbon materials. The linear highly saturated polymers are extremely resistant to oxidation and normally do not require protection against oxidation. They are for the most part chemically inert to action of substances such as acids, or alkalized at ordinary temperatures to ozonization, and to ordinary sulfurization treatments. The type of decomposition referred to in this case is strictly a scissioning of carbon-to-carbon bonds which may be caused by heat alone either in the presence of air or oxygen, or also by vigorous mechanical working which tends to break down the molecular aggregates. As mentioned before, the linear polymers of mono-olefins may be considered as being substantially saturated, for they act like saturated substances with respect to oxidation, and they are saturated with respect to hydrogen to the extent that they have iodine numbers mainly below 10. They are substantially immune to autoxidation.

The disclosed stabilizing agents act to decrease the depolymerization rate either in the presence or absence of air, and furthermore, they impart increased bond strength to the polymer molecules, thus preserving the molecular weights of the polymer and maintaining their tensile strength. Likewise the polymers are preserved from becoming tacky, being substantially nontacky when originally produced. The high molecular weight polymers with a stringy characteristic can be made to retain this desirable characteristic, which is highly useful in lubricants, by the use of stabilizing agents. The stabilizing agents perform the useful function of preserving the strength and molecular weight of the polymers in blending operations which involve a mechanical operation and frequently some elevation of temperature. Thus it is to be noted that the stabilizing agent is mainly useful with polymers having molecular weights ranging from about 30,000 up to as high as 300,000, or more, and having iodine numbers below 10, for it is these grades of polymers which are plastic and solid with substantial tensile strength, with the characteristic of stringiness when blended in an oil, and normally having no substantial tackiness.

Another valuable property of these polymers is their white and translucent appearance, and with stabilizing agents herein provided the discoloration of the polymers is avoided.

A number of tests illustrating this invention are as follows:

TEST I

Tertiary amyl phenolate monosulfide (thioether) of nickel was added in a low concentration of 0.1% to polybutene of 79,000 molecular weight, this stabilizer being mixed into the polymer on a rubber mill. Samples of the polymer containing the stabilizer and blank samples of the polymer which did not contain the stabilizer were subjected to the heat in a constant temperature oven maintained at 300° F. At regular intervals, portions of the samples were removed from the oven for molecular weight determinations. The results of these determinations are given for comparison in the following table:

TABLE I

| Sample | Initial mol. wt. | 1 hr. | 2 hrs. | 3 hrs. | 5 hrs. | 7 hrs. | Loss in in mol. wt. |
|---|---|---|---|---|---|---|---|
| | | | | | | | Percent |
| Blank | 79,000 | 52,000 | 51,000 | 48,000 | 44,500 | 38,500 | 51.3 |
| Blank + 0.1% nickel phenolate thioether | 69,000 | 69,000 | 68,500 | 67,500 | 67,000 | 67,000 | 2.9 |

In these tests the lower initial molecular weight of the stabilized polymer was due to a preliminary breakdown of the polymer while the stabilizer was being added to the polymer, being admixed with the polymer of initial 79,000 molecular weight on the mill. It is to be noted that the stabilizer acted very efficiently in preventing substantial breakdown by heat of the polymer over a prolonged period of time.

Using the same procedure as described above the corresponding phenolate sulfides (thioethers) of the metals zinc, lead, and magnesium were mixed with samples of the polybutene in the same concentration of 0.1% by weight; and these samples were subjected to heating at 300° F. in the oven for a period of 7 hours. In each case the stabilizing agent kept the molecular weight of the polybutene well above that of the blank sample, and it was found that nickel, zinc, and lead in the order named, functioned in a superior manner to the others in this test. Also, it was found that these metal derivatives of the tertiary amyl phenolate thioether were superior in stabilizing the polybutene to tertiary amyl phenol thioether itself.

TEST II

Sample polybutenes of 79,000 molecular weight were milled on a hot rubber mill in which 100 pounds of steam pressure was maintained. To one sample was added 0.1% by weight of tertiary amyl phenolate thioether of nickel. At intervals, portions of the samples were removed and analyzed for their molecular weights. The molecular weight determination for the sample containing the stabilizer and for the blank sample which contained no stabilizer milled under identical conditions and for the same periods of time are listed in the following table:

TABLE II

| Time on mill | Molecular weights | |
|---|---|---|
| | Blank sample | Blank+0.1% nickel tertiary amyl phenolate thioether |
| Initial | 79,000 | 79,000 |
| 5 mins | 66,000 | 75,500 |
| 10 mins | 52,000 | 75,000 |
| 20 mins | 44,000 | 75,000 |
| 30 mins | 29,000 | 73,500 |

From the foregoing test it was observed that the unstabilized polybutene rapidly degraded in about a half-hour until it began to lose its valuable plastic and solid properties, whereas the molecular weight of the stabilized polybutene and its valuable properties were preserved at a high level for the corresponding period of time. Further milling of the stabilized polybutene was carried out for a still longer period of time, and after 3 hours of milling under the conditions described, the molecular weight of the polybutene was still of the order of 70,000.

Using the same stabilizing agent with a polybutene of 79,000 molecular weight and the same concentration of the stabilizing agent, the sample was found to remain in a solid form with good molecular weight for a period of 18 hours when the sample was subjected to hot milling at 338° F.

With 0.1% by weight of tertiary amyl phenolate thioether of calcium admixed in a polybutene having a molecular weight of 54,500, the thus stabilized polymer was worked on a hot mill at 335° F. and was found to have its molecular weight substantially preserved for over a period of 1 hour.

Barium di-isobutyl phenol sulfide was found to be substantially as effective as magnesium tertiary amyl phenol sulfide in preventing heat breakdown.

To investigate the action of ultraviolet light on the polybutene, samples of the polybutene admixed with the stabilizing agents were placed in quartz tubes and exposed to intensified ultraviolet light held at controlled wave lengths and intensity for 48 hours after which the samples were examined for color and loss in molecular weight. The thioether phenolates of the metals, particularly of nickel and zinc were found to prevent serious breakdown of the polymer, and the color of the polymer was found to remain good throughout the test.

It might be pointed out that a number of inhibitors known to be good for preventing deterioration by sunlight of unvulcanized rubber were not useful with the polymers, because they were not compatible therewith, and with some of the rubber stabilizers the polymer became badly discolored.

By admixing with the phenolates substantially equal proportions of free sulfur, e. g. about 0.1% of the phenolate with 0.1% of sulfur, and using this mixture to stabilize the polybutenes against ultraviolet light deterioration, it was noted that the loss in molecular weight of the polybutene was further reduced.

TEST IV

In order to determine what effect the stabilizing agents have on polybutene-wax blends when such blends were heated to an elevated temperature, samples of the material were placed in an oven at 230° F. and portions of the samples were withdrawn at the end of 48 hours and 96 hours then analyzed for change in viscosity characteristics. The blank samples were composed of 75% of paraffin wax, 20% of medium molecular weight polybutenes having molecular weights above 30,000 and 5% of lower molecular weight polybutenes having molecular weights between 1000 and 30,000. The stabilizer was dissolved in some of the samples, and it was found best to mix the stabilizer with a polybutene before blending with the wax in order to obtain greater effectiveness from the stabilizer. Results from these tests in which the nickel phenolate sulfide was employed as a stabilizer are given in the following table:

TABLE III

*Polybutene-wax breakdown at 230° F.*

| Sample tested | Furol seconds at 210° F. | | Seconds lost per hour (96 hours) |
|---|---|---|---|
| | 0 hours | 96 hours | |
| Polybutene-wax Blank No. 1 | 300 | 15 | 2.9 |
| Polybutene-wax Blank No. 2 | 300 | 22 | 2.8 |
| Blank No. 1+0.1% nickel phenolate sulfide | 300 | 107 | 2.0 |
| Blank No. 2+0.1% nickel phenolate sulfide | 300 | 171 | 1.3 |

From the foregoing table can be seen that the phenolate stabilizing agents function to preserve the molecular weight of the polybutene while it is blended with other hydrocarbon compositions, such as a wax, while such compositions are subjected to elevated temperatures.

It has thus been found that the stabilizing agents of the present invention prove to be in a class by themselves in preventing deterioration of the linear type hydrocarbon polymers which are normally resistant to oxidation. When incorporated in this type of polymers they not only prevent breakdown from heat and mechanical working action, but also from ultraviolet light, and have exceptional utility in compositions of the polybutenes with mixtures of other hydrocarbons.

While this invention is described as relating particularly to the improvement of synthetic linear hydrocarbon polymers and especially of branched linear polymers of iso-olefins, it will be understood that the stabilizing agents may be used with modified polymers of analogous compositions and structure that have the tendency to depolymerize as, for example, hydrogenated or saturated polymers of diolefins, and the like, when such polymers have sufficiently low iodine numbers to be normally resistant to oxidization. The stabilized polymers may be used in combination with other ingredients; for example, they may be used in lubricating oil and grease compositions, as plasticizers in rubber, either natural or synthetic resins, in mixtures with waxes or asphalts, or in various other compositions for which these polymers are suitable adjuncts.

The present invention is not to be limited to any theory on the action of the stabilizing agents nor to any particular polymers, and the specific embodiments of this invention which have been used as illustrations are not intended to limit the scope of this invention which is subject to many modifications.

I claim:

1. A polymer composition of increased stability against breakdown by depolymerization, comprising a high molecular weight, substantially saturated, linear polymeric hydrocarbon that has a molecular weight above 1000 and is normally resistant to oxidation and a small quantity of a stabilizing compound which is a metal phenolate.

2. An improved polymer composition of increased stability against depolymerization, comprising a high molecular weight, substantially saturated, linear hydrocarbon polymer that has a molecular weight above 1000 and is normally resistant to oxidation and from about 0.01% to about 5% by weight of a metal phenolate sulfide.

3. A composition according to claim 2, in which said phenolate sulfide contains a polyvalent base metal.

4. A polymer of increased stability toward heating and mechanical action, comprising a polybutene having an average molecular weight above 30,000 and between about 0.01% and 5% of thioether phenolate to inhibit the molecular weight breakdown of the polybutene.

5. A composition as described in claim 4, in which the thioether phenolate is characterized by the grouping:

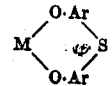

wherein M represents a divalent metal and Ar represents an aromatic nucleus.

6. A composition as described in claim 4, in which the polybutene is stabilized by a small amount of nickel tertiary amyl phenolate sulfide.

7. A composition as described in claim 4, in which polybutene is stabilized by lead tertiary amyl phenolate sulfide.

8. A composition as described in claim 4, in which the polybutene is stabilized by zinc tertiary amyl phenolate sulfide.

9. A polymer composition of increased stability against breakdown by depolymerization, comprising a high molecular weight, substantially saturated, linear polymeric hydrocarbon that has a molecular weight above 1000 and is normally resistant to oxidation and a small quantity of a stabilizing compound derived from a compound of the formula:

$$Ar-XH$$

wherein Ar represents an aromatic cyclic compound nucleus and X represents an element selected from the group consisting of oxygen, sulfur, selenium and tellurium, by replacement of the hydrogen of the —XH by a metal.

WILLIAM J. DALY.